United States Patent [19]

Berry

[11] 4,303,871

[45] Dec. 1, 1981

[54] NUTATING MOTOR CURRENT CONTROL

[75] Inventor: Eddie T. Berry, Renton, Wash.

[73] Assignee: Morgan Actuators, Inc., Seattle, Wash.

[21] Appl. No.: 128,959

[22] Filed: Mar. 10, 1980

[51] Int. Cl.³ .............................................. H02P 6/02
[52] U.S. Cl. .................................. 318/138; 318/254; 318/439
[58] Field of Search .................. 318/138, 254, 254 A, 318/439

[56] References Cited

U.S. PATENT DOCUMENTS

4,081,726  3/1978  Leenhoots et al. ................. 318/138
4,107,595  8/1978  Campe ................................ 318/254

Primary Examiner—J. D. Miller
Assistant Examiner—John W. Redman
Attorney, Agent, or Firm—Seed, Berry, Vernon & Baynham

[57] ABSTRACT

A current sensing circuit monitors the currents flowing through the stator windings of a nutating motor. The current drive circuits for the windings are capable of delivering large currents with a fast rise time so that the magnetic circuits of the nutating motor quickly saturate, providing precise operation of the motor. Steering diodes quickly discharge the windings into the power supply. When a predetermined winding current level is exceeded, the current sensing circuit produces an output signal which momentarily disables the current drive circuits for the windings so that the stator winding currents are limited to levels sufficient to precisely operate the nutating rotor. The sensing circuit has a hysteresis characteristic which in conjunction with the energy stored in a winding causes the current in a winding to be maintained between certain maximum and minimum levels.

12 Claims, 8 Drawing Figures

NUTATING MOTOR CURRENT CONTROL

BACKGROUND OF THE INVENTION

1. Field of the Invention

This invention relates in general to drive circuits for nutating motors and, more particularly, to current control circuits for nutating motors.

2. Description of the Prior Art

A typical nutating motor has an electromagnetically stepped rotor which moves with a wobbling motion about the axis of an output shaft. The rotor is a magnetically permeable plate which has a ring gear portion which is in rolling contact with another ring gear fixed to a stator portion of the motor. The stator has a plurality of windings for sequentially energizing a series of electromagnets circumferentially spaced around the stator. The stator windings are sequentially activated causing the rotor to nutate or wobble around the axis of the output shaft. If the number of teeth on the ring gears are different, the rotor will move an angular distance equal to the difference in the number of teeth between the two gears for each nutation cycle.

A typical nutating motor and the drive circuits therefor are described in U.S. Pat. No. 3,492,515. A drive circuit for a nutating motor includes a distribution network which sequentially provides drive currents to the stator windings of the motor. Output signals from a ring counter operate power transistors connected to each of the windings and the speed of the motor is controlled by varying the output signal frequency. Some motors have a pair of adjacent windings energized. This insures that at least one winding is always energized to maintain continuous control of the rotor. Another prior art control circuit for a nutating motor operates from three phase AC signals which are rectified by a diode network to provide a sequence of output current pulses for each winding of a motor. Many installations using nutating motors do not have three-phase AC power available. Those installations which do have three-phase AC power available often do not have means for varying the frequency of the signals so that the speed of a nutating motor is not adjustable.

Some control systems for nutating motors permit the motor to be operated over a range of speeds. These systems do not compensate for low speed and high speed motor operation. At high speeds, fast current rise and fall times are required to operate the motor so that the stator magnetic circuits quickly saturate and discharge to provide precise control for the motor. At low speeds, the currents quickly saturate the winding and continue to rise to levels which are far in excess of the current levels required to hold the rotor in position. These excessive current levels cause undesirable heating of the nutating motors. Limiting the current levels, such as by inserting resistance in the stator winding circuits, adversely affects the current rise and fall times. Regulating the current through the motor winding with a constant current regulator causes excessive power to be dissipated by the current regulator. The use of switching circuits is complicated by the reverse emf generated when a switching circuit abruptly opens the current path through the winding. The relatively high voltages generated under such circumstances are normally shunted by a normally back-biased quenching diode connected across the winding. However, such diodes limit the reverse emf to less than a volt. Consequently, the current decay through the winding is very slow, thus limiting the transient response of the system. While zener quenching diodes would permit a larger reverse emf, and hence a faster current decay, the power dissipated in the zener diode would be greatly increased.

SUMMARY OF THE INVENTION

It is an object of the invention to provide an electronic control circuit which permits a nutating motor to be operated over a wide range of speeds.

It is another object of the invention to provide a control circuit for protecting a nutating motor from overheating.

It is another object of the invention to provide good locking characteristics for a nutating motor without requiring excessive current levels.

It is another object of the invention to provide an electronic control means which permits a nutating motor winding to quickly saturate and discharge for quick, precise stepping of the motor.

It is still another object of the invention to regulate the current flowing through a motor winding without either dissipating excessive power in the current regulating circuit or limiting the transient response of the regulating circuit and motor.

Basically, these and other objects of the invention are achieved by a control system for a nutating motor which disables the drive circuits for the motor winding in response to a signal from a comparator. A sensing means monitors the motor winding currents and provides a signal to the comparator having a hysteresis characteristic so that a lower current threshold level is set after a current above a predetermined level has been sensed. A control circuit fed from the comparator intermittently turns off a transistor switch at each terminal of a winding and the energy stored in the windings is steered by diodes to the power supply so that current continues to flow so that the rotor is held in position even though the current drivers are cut off. The windings are thereby permitted to be driven by fast rise time, low resistance circuits which enable the motor windings to be quickly saturated for precise, accurate operation of the nutating motor. The steering diodes are connected to provide quick discharge of the winding current. The control system provided according to the invention advantageously permits the winding currents to be held between levels which are sufficient to maintain the coil winding in saturation, but which do not cause excessive heating of the motor. The system thus provides accurate, efficient operation of a nutating motor.

BRIEF DESCRIPTION OF THE PREFERRED EMBODIMENTS

Figure 1:
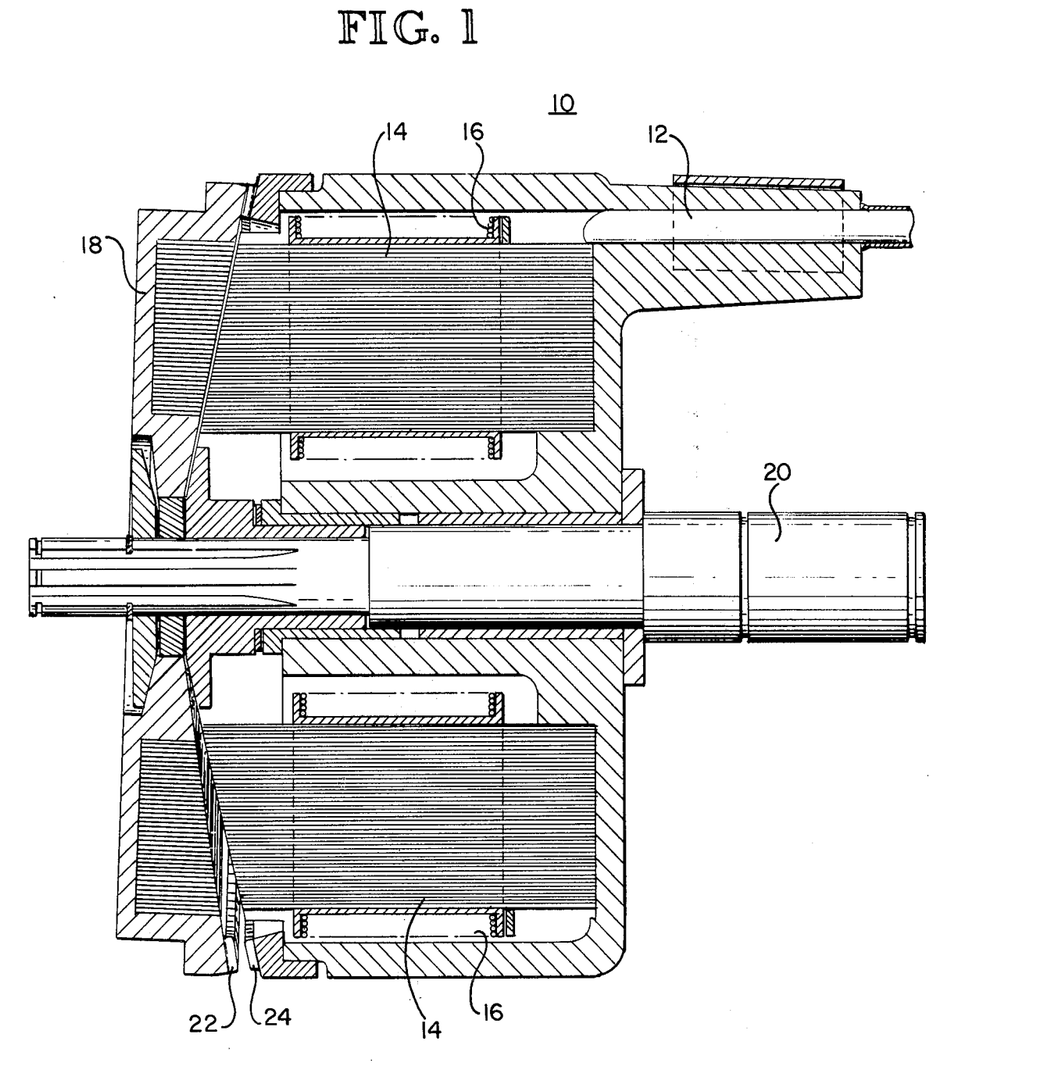
FIG. 1 is a partial cross-section view of a representative nutating motor.

Referring to FIG. 1 of the drawing, a representative nutating motor assembly 10 is shown. Control signals are provided to the motor through a control cable 12. The motor assembly includes a plurality of magnetically permeable stator pole pieces 14 which are spaced around the circumference of a circle. Each of the stator pole pieces 14 is energized by means of a coil winding 16 surrounding each of the pole pieces 14 as shown. The windings 16 are activated through conductor pairs which are part of the cable 12. A nutating element, or rotor 18, is pivotably coupled to a motor output shaft 20. The rotor 18 nutates or moves with a wobbling motion as adjacent stator pole pieces 14 are sequentially energized. This causes a segment of the rotor 18 to be drawn toward the stator so that the corresponding teeth of oppositely facing ring gears 22, 24 respectively formed on the rotor 18 and the stator engage. The number of teeth on the ring gears are different so that as the rotor 18 completes one rotation cycle, the rotor 18 rotationally advances an angular distance equal to the difference in the number of teeth of the ring gears 22, 24. The nutating motion of the rotor 18 is thereby translated to a rotational movement of the shaft 20 about its axis. It is desirable that the current sources for the windings 16 have fast rise times so that the stator poles 14 are quickly saturated, causing precise and accurate rotation of the rotor 20. Fast rise times for the currents driving the windings 16 require that the resistance of the drive circuits be as low as possible. At steady-state conditions, high currents can be produced in the windings 16 by the low resistance drive circuits and windings. Unless they are otherwise limited, the high currents will cause excessive heating of the pole pieces 14 and the windings 16. In order to hold the rotor in position on the stator, it is necessary that the pole piece 14 be driven just beynd saturation. Excessive drive currents are not necessary for proper operation of the motor and excessive currents in the windings 16 cause unnecessary heating of the motor without improving performance.

System Block Diagram

Figure 2:
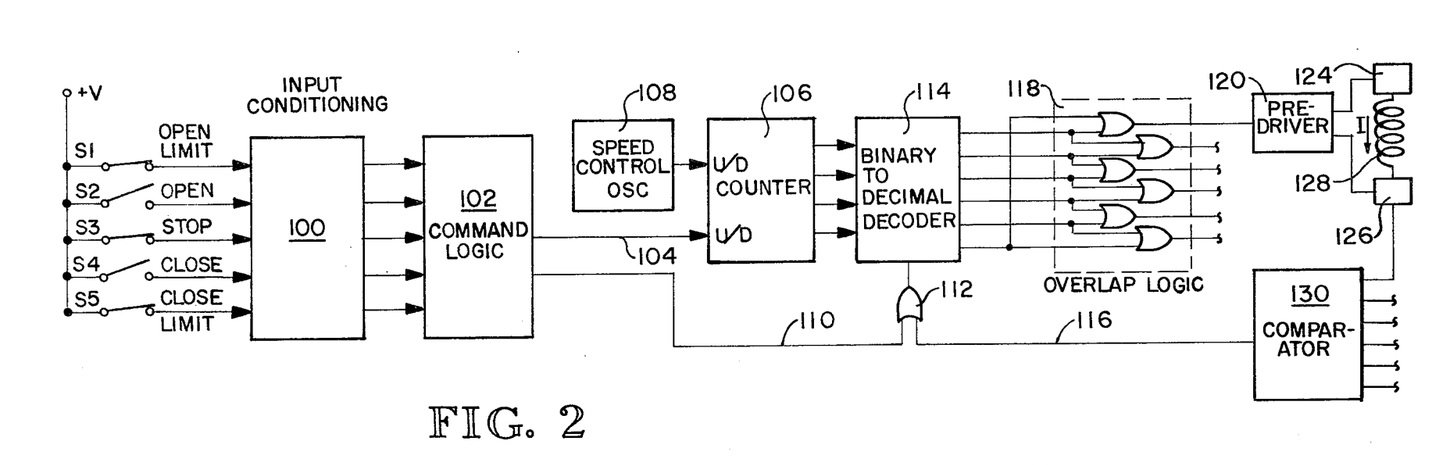
FIG. 2 is a block diagram of a control circuit according to the invention.

Referring to FIG. 2, an electrical block diagram of a control circuit for controlling the currents driving a nutating motor is shown. Five control switches S1–S5 provide inputs for controlling the motor. In this embodiment, the nutating motor controls a valve and the various switches S1–S5 are accordingly used. One terminal of each of the switches S1–S5 is connected to a positive 18 volt supply voltage V as shown. Switch S1 is a normally closed conventional limit switch which opens when the nutating motor drives the valve to a fully open position. Switch S2 is a normally open push-button switch which is actuated and closed by an operator to cause the nutating motor to be operated in a direction to open the valve. Switch S3 is another normally closed push-button switch which when opened stops the nutating motor. Switch S4 is a normally open push-button switch which when actuated causes the nutating motor to drive the valve to a closed position. Switch S5 is a normally closed limit switch which opens when the nutating motor has driven the exemplary valve to a fully closed position. Each of the output terminals of the switches S1–S5 is connected to an input signal conditioning circuit 100 which helps removes noise on the input switch lines and converts the signals produced by the various switch actuations to logic levels suitable for operation with the conventional MOS logic elements used in this system.

The five outputs from the input conditioning circuit 100 corresponding to the switches S1–S5 are fed to a command logic circuit 102. The command logic circuit 102 provides an output binary signal on the data signal line 104 which is fed to the up/down control terminal of a conventional up-down, or reversible, binary counter 106. The state of the signal at the up/down control terminal of the up-down counter 106 determines whether the binary output signals from the counter sequence in an ascending or a descending order. The order determines the direction of rotation of the nutating motor. The clock input terminal of the up-down counter 106 is fed from a speed control oscillator circuit 108 with the frequency of the output clock pulses determining the rotational speed of the nutating motor.

The command logic circuit 102 also provides a motor enable/disable signal on a data signal line 110 which is fed to one input of an OR gate 112. The output of the OR gate 112 is fed to the disable input terminal of a binary-to-decimal decoder circuit 114. Note that another input to the OR gate 112 provided on the data signal line 116 is also available to disable the binary-to-decimal decoder 114. Each of the six outputs of the decoder circuit 114 is fed to the inputs of two OR gates of the overlap logic circuit 118. The outputs of the decoder 114 select and enable the windings of the nutating motor. In this embodiment, two adjacent windings are simultaneously activated by the over lap logic circuit 118 in order to keep the rotor under control at all times. Each of the OR gates in the overlap logic circuit 118 feeds a corresponding predriver circuit 120 which in turn activates a pair of power transistor switching circuits 124, 126 connected at each end of a motor winding coil 128. Each winding has a current sensing circuit which provides a representation of the current through each coil. The representative signals are fed through diodes to the comparator circuit 130. The largest signal back-biases the other diodes so that the comparator circuit 130 responds only to the largest of the representative signals. The comparator has an input filter circuit which shapes the representative signal to correspond to the winding current waveshape. If a predetermined current level through a winding is exceeded, the comparator 130 provides an output on the data signal line 116 to the OR gate 112 which disables the decoder circuit 114. Disabling the decoder circuit 114 causes the predriver circuits 120 to be disabled. The comparator circuit 130 has a hysteresis characteristic such that a lower current threshold level is set for the current sense current 130 after a current level above the predetermined threshold current level has been sensed. As will be shown, the electromagnetic energy stored in a motor winding coil 128 is returned to the system power supply through steering diodes when the predriver circuits 120 are cut off. As the motor winding current drops below the second, lower current threshold level, the decoder circuit 114 is enabled and the predriver circuits 120 are enabled. The higher current threshold level must again be exceeded to cut off the predriver circuits. The current in the motor winding 128 thus fluxuates, for example, between 4 and 5 amperes, which current levels are chosen to maintain the stator poles in saturation while avoiding excessive heating of the nutating motor components.

Figure 3A:
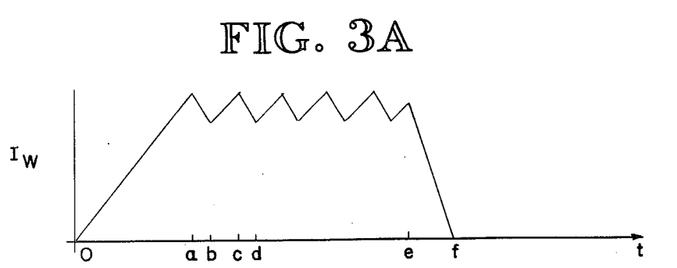
FIGS. 3A, 3B and 3C show waveform diagrams at various points in the system.
Figure 3B:
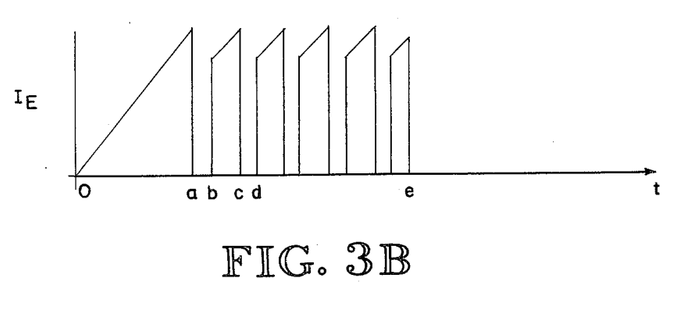
Figure 3C:
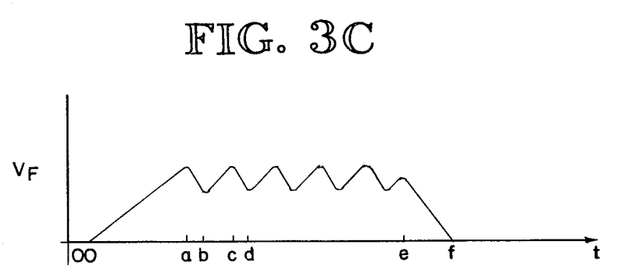
Figure 4:
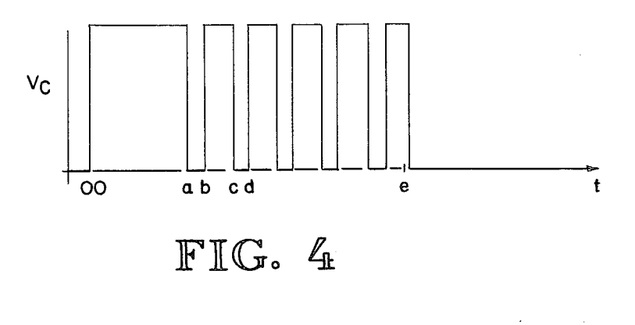
FIG. 4 is a waveform diagram of a control voltage for a nutating motor winding.

FIGS. 3A, 3B and 4 show typical waveforms for the system having corresponding time coordinates. FIG. 3A shows a typical winding current $I_W$. FIG. 3B shows a waveform for the current $I_E$ at the emitter of one of the transistor switches 126. The wave form for $I_E$ drops to zero when the transistor switches 126, 128 are turned off. FIG. 3C shows the voltage $V_F$ waveform for the signal presented to the input of the comparator 130, which signal has been shaped by the comparator input filter to correspond to the winding current waveshape. FIG. 4 shows the output voltage $V_C$ for the comparator 130 which has a hysteresis characteristic. The voltage $V_C$ is the control signal and is inverted to enable the decoder 114. When a winding is first energized, the segment of FIG. 3A during the interval oa represents the initial current into the winding.

FIG. 3B shows the corresponding emitter current of the switching transistor 126 and FIG. 3C shows the filtered input voltage $V_F$ to the comparator circuit 130. At time a, the comparator is turned off and the switches 124, 126 are turned off so that no current $I_E$ flows. The hysteresis characteristic of the comparator 130 keeps the comparator off until the voltage $V_F$ falls below the lower comparator threshold at time b. The comparator is turned on and current flows through the winding until time c when the upper threshold level of the comparator is exceeded and the comparator 130 is turned off. This cycle continues until time e when the counter 106 selects another winding and turns off the transistor switches 124, 126. The winding current $I_W$ and the filter ouput voltage $V_F$ rapidly drop to zero by the time f.

Detailed Circuit Descriptions

Figure 5:
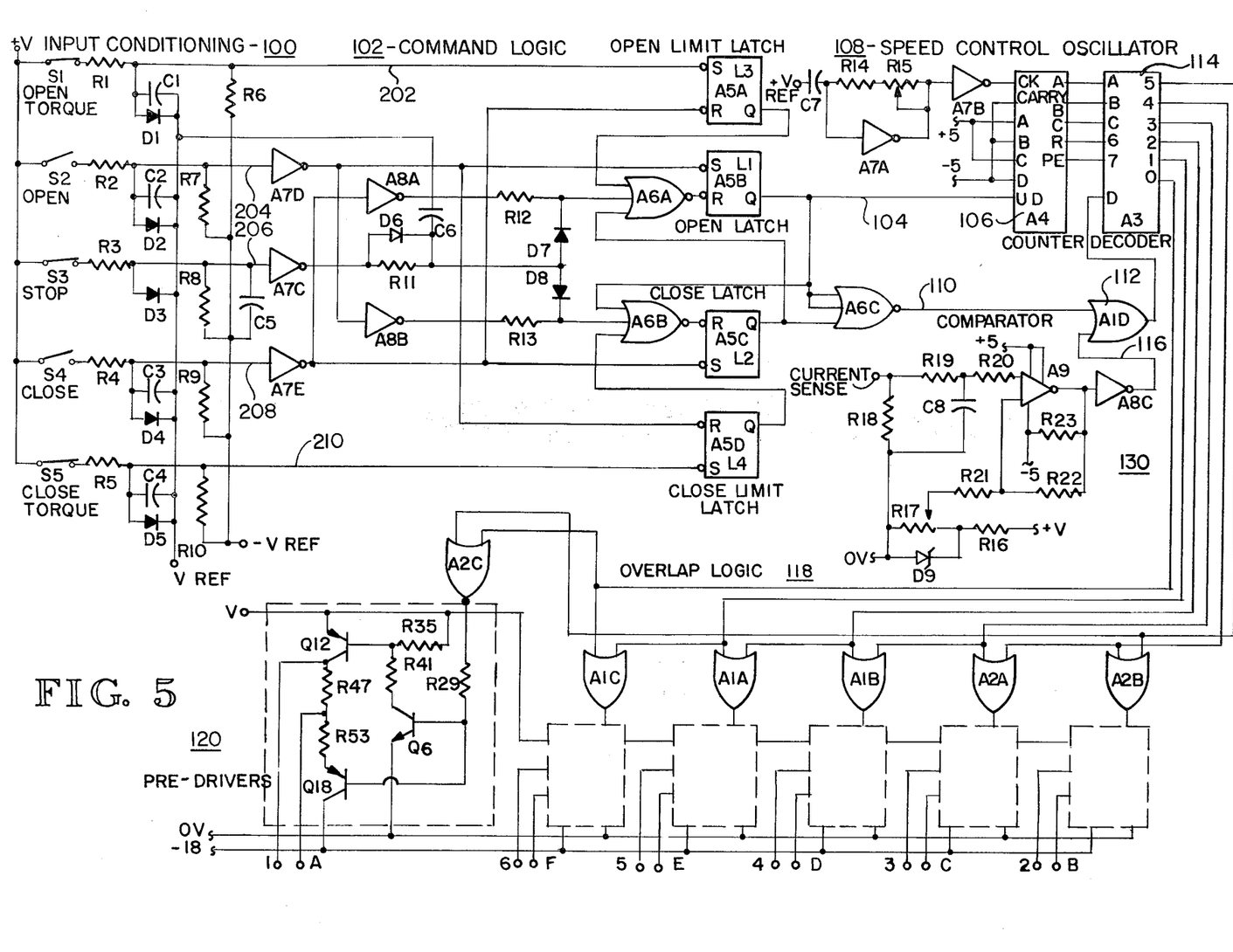
FIG. 5 is a circuit diagram of a control circuit for a nutating motor according to the invention.

Referring to FIG. 5, the input conditioning circuit 100 translates the voltages provided by the switches S1–S5 to appropriate voltage levels for the command logic circuit 102 which are, for example, MOS circuits operated from positive and negative five volt power supplies. The circuit components associated with switch S1 and its operation are representative of the other switch circuits. When switch S1 is closed, an 18 volt signal from the voltage supply +V is applied to one end of the resistor R1. The other end of the resistor R1 is clamped by the diode D1 to the positive voltage +VREF which is a positive five volt source. Capacitor C1 provides a shunt to +VREF for noise on the input signal lines. One end of the resistor R6 is connected to the second end of the resistor R1 and forms a voltage divider with resistor R1. The other end of the resistor R6 is connected to a negative 5 volt supply, −VREF. When the switch S1 is open, the voltage at the junction point of the resistors R1 and R6 goes to the value of −VREF. The junction point is connected to a signal line 202. When the switch is closed, signal line 202 is clamped to the +VREF voltage. Switches S2–S5 operate similarly to provide appropriate voltages on the signal lines 204, 206, 208 and 210 210.

The command logic circuit 102 includes four set-reset flip-flop latches: an open limit latch A5A, an open latch A5B, a close latch A5C, and a close limit latch A5D. These flip-flops operate such that a logical high on the reset R or the set S input produce no change at the output terminal Q. The command logic circuit 102 receives as inputs the signals from the control switches S1–S5 and the outputs of the command logic circuit 102 are on the data signal lines 104 and 110 as shown in FIGS. 2 and 5 of the drawings. Line 104 is connected to the up/down control terminal U/D of the counter 106. Line 110 is connected to one input terminal of the OR gate A1D which is designated 112 in FIG. 2. The output of the OR gate A1D is connected to the output disable input terminal D of the decoder 114. A low signal at terminal D enables the decoder 114.

Operation of the command logic circuit 102 controlled by the switches S1–S5 is summarized as follows:

To stop the nutating motor, the stop switch S3 is opened by an operator. The switch S3 provides a logical low output on line 206 which is inverted by the inverter A7C to a logical high signal, which is coupled through the diodes D7, D8 to input terminals of the NOR gates A6A and A6B. Any logical high input to a NOR gate causes the output thereof to go to a logical low level. The NOR gate outputs are connected to the reset R inputs of both the open latch A5B and the close latch A5C and reset the Q outputs to low levels, causing the output of NOR gate A6C to go high. A logical high input to the decoder 114 causes the outputs of the decoder 114 to go to logical low levels and cuts off the overlap logic OR gates to disable the predriver circuits. Note that the Q output of the open latch A5B is also connected to the up/down control input terminal U/D of the counter 106 and that a high logic level on terminal U/D causes the motor to run in a direction to open a valve.

To open the valve, the switch S2 is actuated to a closed position by an operator. When the switch S2 is closed, a logical high appears on the data signal line 204 connected to the input of the inverter A7D. The low output of the inverter A7D is connected to the set input of open latch A5B, which provides a logical high at its Q output. The high output of the open latch A5B is fed to one of the inputs of a NOR gate A6B and the resultant low output of the NOR gate A6B resets the Q output of the close latch A5C to a low state. The low output of the latch A5C is fed to one of the inputs of the NOR gate A6C and together with a high input from the open latch A5B produces a logical low at the output of the NOR gate A6C. If a low output from the current comparator circuit 130 is present, the decoder 114 is enabled. The high input to the U/D terminal of the counter 106 from the latch A5B causes the counter 106 to up count and drive the motor in a direction to open the valve.

To limit the opening of the valve, switch S1 is provided. Switch S1 is a limit switch which is opened when the valve being driven by the nutating motor is fully opened. When switch S1 is opened, a logical low appears on the data signal line 202 which sets the open limit latch A5A causing the Q output thereof to go to a high state. The high Q output of the latch A5A is connected to an input of the NOR gate A6A which provides a logical low at its output terminal for resetting the open latch A5B such that the Q output of latch A5B goes to a logical low state. The low Q output of the latch A5B is coupled to two input terminals of the NOR gate A6C. The Q output of the close latch A5C is low and a logical high appears at the output of NOR gate A6C to disable the decoder 114 and the nutating motor.

To close the valve, the switch S4 is closed. When this occurs, a logical high is coupled to the data signal lines 208 which feeds the input of an inverter A7E. A logical low appears at the output of the inverter A7E and is coupled to the input of an inverter A8A which provides a logical high at its output. The logical high is coupled through a resistor R12 to an input of the NOR gate A6A. The output of the NOR gate A6A goes to a logical low which resets the Q output of the open latch A5B which causes the counter 106 to down count. The logical low output of the inverter A7E is also coupled to the reset input of the open limit latch A5A and causes the Q output thereof to go to a logical high which is connected to an input of the NOR gate A6A. The logical low at the output of the inverter A7E also sets the Q output of the close latch A5C to a high state. The output of NOR gate A6C goes low and a low output from the current sensor circuit 130 enables the decoder 114 outputs to operate the nutating motor in a direction to close the valve.

To limit the closing of the valve, switch S5 is provided. Switch S5 is a limit switch which is opened when the valve is driven closed. When switch S5 is opened, a logical low appears at the set input of the close limit latch A5D and causes the Q output thereof to go a logical high state. The high Q output of latch A5D is connected to the input of the NOR gate A6B and a logical low is produced at the NOR gate output A6B which resets the open limit latch A5C producing a logical low at the Q output thereof which causes the output of the NOR gate A6C to go to a logical high level, disabling the decoder 114 outputs and the motor driving the valve.

In summary, the switches S1–S5 are actuated to control the output states of the latches A5A, A5B, A5C and A5D which determine whether the counter 106 counts up or down and whether the decoder 114 is enabled or disabled.

All of the inverters of this embodiment are Schmitt-trigger types such as commercially supplied by RCA as 74C14N devices. The speed control oscillator circuit 108 includes an inverter A7A which has its output connected to the input of another inverter A7B which feeds the clock pulse input CK of the up-down counter 106. The output signal of the inverter A7A is fed back through a variable resistor R15 and a resistor R14 to the input terminal of the inverter A7A. A capacitor C7 is connected from the input of the inverter A7A to the positive voltage VREF. The series resistance combination of R14, R15 and the capacitor C7 provide a frequency adjustment for the clock signals to the counter 106, which provides binary coded output signals in ascending or descending order as determined by the logic signal on the up/down terminal U/D thereof.

The binary to decimal decoder circuit 114 provides output binary signals when it is enabled by a low at the output of OR-gate 112. The binary signals control the OR gates A2C, A1C, A1A, A1B, A2A and A2B of the overlap logic circuit 118. Two of the OR gates are simultaneously actuated to provide overlapping operation of motor windings.

The comparator circuit 130 includes a comparator A9, for example an LM 311N provided by the National Semiconductor Company, which compares a voltage corresponding to the largest motor winding current at the current sense input terminal to a reference voltage provided by the adjustable voltage reference circuit formed from the potentiometer R17, the voltage-dropping resistor R16, and the voltage reference diode D9. Resistor R16 is connected to the +V voltage supply and the anode of the reference diode D9 to the 0 volt, or ground reference. A hysteresis characteristic for the comparator is provided by the resistors R21 and R22. A resistor R19 provides a ground return path. A resistor R19 and a capacitor C8 form a low-pass filter circuit for the input signal to the comparator. The low-pass filter circuit shapes the input signal to the comparator A9 to have a waveshape corresponding to the current of the current through a winding.

A typical pre-driver circuit 120 fed from one of the overlap OR gates is shown in FIG. 5. A logic high at either of the input terminals of the OR gate A2C produces a high voltage output which is connected through the resistor R29 to the bases of switch transistors Q6 and Q18. The emitter of the switching transistor Q6 is connected to the 0 volt reference buss. The collector of Q18 is connected to a −18 volt reference buss. A high output from the OR gate A2C turns the transistor Q6 on which causes the voltage at the collector of Q6 to drop to almost 0 volts. The series resistors R41, R35 are connected to the collector of Q6 and to the +V 18 volt supply. The junction point of the resistors R35 and R41 is connected to the base of a switching transistor Q12. When the collector of Q6 goes low, transistor Q12 is turned on and connects the 18 volts of the +V supply to the collector of Q12. Output terminal 1 of the pre-driver circuit 120 has approximately 18 volts applied thereto when Q12 is turned on. Output terminal A of the pre-driver circuit 120 is coupled to the collector of transistor Q12 through resistor R47. The emitter of transistor Q18 is connected through resistor R53 to terminal A. Note that when a −5 volt low logic level appears on the base of transistor Q18, transistor Q18 has approximately −5 volts at its emitter which provides a discharge path for the base-emitter capacitance of a transistor switch Q102, described below, thereby allowing the switch to be turned off faster. The other five pre-driver circuits in this embodiment have similar circuit configurations with their input and output terminals connected as shown in FIG. 5.

Figure 6:
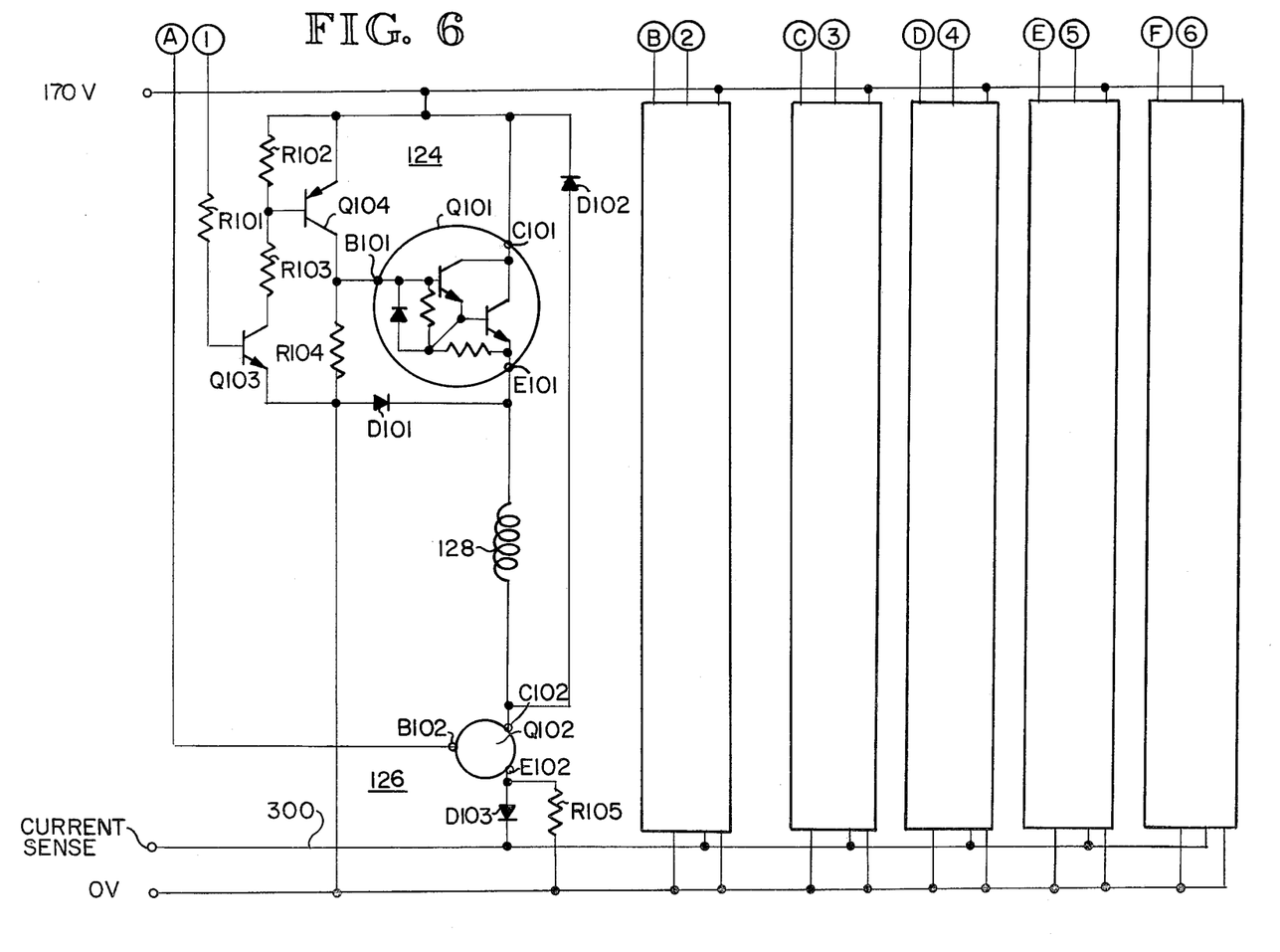
FIG. 6 is a circuit diagram of the drive circuits for the windings of a nutating motor.

A typical power-switching drive circuits for one of the six nutating motor coil windings is shown in FIG. 6. The output terminals of the pre-driver circuits of FIG. 5 correspond to the input terminals of FIG. 6. Terminal A of FIG. 6 is connected to the input terminal B102 of a Darlington amplifier Q102 which is commercially available from a number of manufacturers. The internal circuit of the Darlington power amplifier Q102 is the same as that shown for Darlington amplifier Q101. The Darlington amplifiers are used as switches for high currents through the motor windings. The emitter terminal E102 of the Darlington amplifier Q102 is connected through R105 to the 0 volt reference buss. Diode D103 couples the voltage at terminal E102 of the Darlington amplifier Q102 to a current sense common line 300 which is connected to the current sense terminal of the comparator circuit 130 of FIG. 5. The winding 128 of a nutating motor has one end connected to the collector terminal C102 of the Darlington amplifier Q102. The Darlington amplifier Q102 is switched on by a positive signal being applied to its base B102 from terminal A. Terminal A is connected through resistor R47 of FIG. 5 to the 18 volt power supply when Q12 is turned on. Terminal 1 of FIG. 6 is connected to one end of a resistor R1 which has the other end thereof connected to the base of a transistor Q103 which has its emitter connected to the 0 volt reference buss. When a positive voltage is applied to terminal 1, transistor Q103 is turned on. The collector C101 of the Darlington amplifier Q101 and the emitter of a switching transistor Q104 are connected to a high voltage source, a 170 volt power supply for this embodiment. The emitter of a transistor Q104 is connected to the high voltage source so that when transistor Q103 turns on, a voltage divider R102, R103 connected to the high voltage source provides a voltage at the base of transistor Q104 which switches Q104 on so that the collector of Q104 has approximately 170 volts on it. The base B101 of the Darlington amplifier Q101 is connected to the switching transistor Q104 collector which is coupled through a resistor R104 to the ground reference buss. A high voltage at the collector of Q104 turns on the Darlington amplifier Q101 to provide approximately 170 volts to the other side of the motor winding 128. When Q102 is on, the emitter voltage of Q102 across the ½ ohm resistor R105 is indicative of the current through the winding 128. The emitter voltage of Q102 is coupled through a diode D103 to the current sense line 300. All of the other winding currents are similarly sensed by similar diode coupling circuits connected to the current sense line 300. Note that the largest voltage provided by one of the winding circuits will back-bias the other coupling diodes corresponding to D103 and the comparator A9 is controlled by the largest winding current. Several windings may simultaneously have currents flowing therethrough because of the overlap logic circuit and because of switching time delays, but the largest current controls the comparator 130.

Note that because energy is stored in the field of a winding, current continues to flow for a time through a winding even when the Darlington amplifier switches Q101, Q102 are switched off. A first current steering diode D101 is connected as shown between the emitter terminal E101 of the switch Q101 and the reference ground buss. A second current steering diode D102 is connected as shown between the collector terminal C102 of the switch Q102 and the 170 volt buss. When the transistor switches Q101 and Q102 are turned off, the stored energy in the winding produces a reverse polarity voltage of approximately 170 volts. Current is steered from the winding through the diode to the voltage source connected between the 170 volt buss and the reference ground buss because the current steering diodes D101 and D102 are forward biased by the reverse polarity voltage. The large reverse voltage across the winding permits a large time rate of change for the winding current. The energy returned to the voltage source by the steering diodes D101, D102 is utilized by the other windings energized from the voltage supply.

While a particular embodiment of the invention has been shown and described, it should be understood that the invention is not limited thereto since many modifications may be made. It is therefore contemplated to cover by the present application any and all such modifications which fall within the true spirit and scope of the basic underlying principles disclosed and claimed herein.

I claim:

1. A system for controlling the current in an inductive winding of a motor, said motor operated from a power supply, comprising:
   a first switch means coupled between a first terminal of the power supply and a first terminal of the winding;
   a second switch means coupled between a second terminal of the power supply and a second terminal of the winding;
   means for sensing the current in the winding;
   comparator means coupled to the sensing means and providing an output signal indicative of the winding current exceeding a predetermined maximum level;
   means for controlling the first and second switch means, said control means turning off the first and second switches in response to the indicative signal so that the winding current is limited to the predetermined maximum level; and
   steering means for allowing the winding current to flow from the second terminal of the winding to the first terminal of the power supply and from the first terminal of the winding to the second terminal of the power supply while limiting the reverse emf to approximately the power supply voltage when the first and second switch means are turned off so that energy stored in the winding is returned to the power supply.

2. The system of claim 1, wherein the first and second switch means include switching transistors.

3. The system of claim 1, wherein the current sensing means includes a resistor coupled in series with the winding and a diode which couples the voltage developed across the resistor to the comparator means.

4. The system of claim 1, wherein the sensing means includes an input circuit for shaping the input signals from the sensing means to conform to the winding current.

5. The system of claim 1, wherein the comparator means has hysteresis so that, after a current level above the predetermined maximum threshold level is detected, the comparator means threshold level is set to a lower predetermined minimum current level thereby maintaining the winding current between the predetermined maximum and minimum current levels.

6. The system of claim 1, wherein the steering means includes a pair of current-steering diodes each coupled respectively to a terminal of the winding and a power supply terminal, each diode being back-biased when the switch means are turned on, and the diodes return energy from the winding to the power supply when the switch means are turned off.

7. The system of claim 1 wherein said motor is a nutating motor having a plurality of windings.

8. The system of claim 7, wherein the control means includes a selector circuit for sequentially selecting one of the plurality of windings, the selector circuit is enabled by the indicative output signal of the comparator means.

9. The system of claim 8, wherein the selector circuit includes:
   a clock pulse source;
   a clock pulse counter having an input coupled to the clock pulse counter and having a plurality of output terminals having coded output signals present thereat which represent the number of clock pulses counted; and
   a decoder circuit receiving the coded output signals of the clock pulse counter, the decoder circuit having output terminals which are selectively activated in response to the coded clock pulse counter output signals, each of the decoder circuit output terminals coupled to actuate the first and second switch means for one of the plurality of windings.

10. The system of claim 9, wherein the clock pulse counter is an up-down counter permitting the windings to be sequenced to operate the nutating motor in a forward or reverse direction.

11. A system for controlling the current in an inductive winding of a motor, said motor adapted to be connected to a power supply, comprising:

a first switch means connected between a first terminal of the voltage supply and a second terminal of the winding;

a second switch means connected between a second terminal of the power supply and a second terminal of the winding;

means for simultaneously turning on and off said first and second switches; and steering means for allowing the winding current to flow from the second terminal of the winding to the first terminal of the power supply and from the first terminal of the winding to the second terminal of the power supply while limiting the reverse emf to approximately the power supply voltage when the first and second switch means are turned off, thereby permitting a large reverse emf across said winding while returning energy to said winding to the power supply.

12. The system of claim 11, wherein the steering means includes a pair of diodes each coupled respectively to a terminal of the winding and a power supply terminal, each diode being back-biased when the switch means are turned on, and each diode forward-biased to return energy from the winding to the power supply when the switch means are turned off.

* * * * *